United States Patent [19]

Moriya

[11] Patent Number: 4,655,701

[45] Date of Patent: Apr. 7, 1987

[54] GRANULATING APPARATUS

[75] Inventor: Nobuharu Moriya, Osaka, Japan

[73] Assignee: Fuji Paudal Kabushiki Kaisha, Osaka, Japan

[21] Appl. No.: 831,365

[22] Filed: Feb. 19, 1986

[51] Int. Cl.⁴ .............................................. B01J 2/10
[52] U.S. Cl. .................... 425/222; 366/294; 366/295; 366/296; 366/309; 366/313; 366/326
[58] Field of Search ............... 425/222; 366/294, 295, 366/296, 309, 312, 313, 326

[56] References Cited

U.S. PATENT DOCUMENTS

| 937,025 | 9/1909 | Dickson | 366/295 |
|---|---|---|---|
| 3,131,424 | 5/1964 | Ishimitsu et al. | 425/222 |
| 3,142,862 | 8/1964 | Guldman | 425/222 |
| 3,326,642 | 6/1967 | Ruble | 425/222 |
| 3,353,208 | 11/1967 | Fergus | 425/222 |
| 3,689,035 | 9/1972 | List | 366/309 |
| 4,123,226 | 10/1978 | Vanderveen | 425/222 |
| 4,154,407 | 5/1979 | Lamort | 241/38 |
| 4,205,920 | 6/1980 | Vigano | 366/326 |
| 4,207,050 | 6/1980 | Engelleitner | 425/222 |
| 4,403,868 | 9/1983 | Kupka | 366/295 |
| 4,509,860 | 4/1985 | Lasar | 366/296 |

FOREIGN PATENT DOCUMENTS

| 1045625 | 1/1979 | Canada | 366/312 |
|---|---|---|---|
| 2161030 | 6/1973 | Fed. Rep. of Germany . | |
| 2434330 | 1/1976 | Fed. Rep. of Germany . | |
| 3333733 | 3/1984 | Fed. Rep. of Germany . | |
| 1189754 | 6/1959 | France . | |
| 57-56369 | 11/1982 | Japan . | |
| 58-12050 | 3/1983 | Japan . | |
| 59-55338 | 3/1984 | Japan . | |
| 59-59239 | 4/1984 | Japan . | |
| 59-21649 | 5/1984 | Japan . | |
| 60-179130 | 9/1985 | Japan | 425/222 |
| 263351 | 8/1949 | Switzerland . | |
| 119109 | 8/1958 | U.S.S.R. | 366/309 |

Primary Examiner—Tim Miles
Attorney, Agent, or Firm—Shefte, Pinckney & Sawyer

[57] ABSTRACT

A granulating apparatus particularly adapted for advanced ceramic materials having a granulation vessel with a cylindrical main body in which are coaxially-mounted rotatably an annular cage-like stirring rotor having peripheral stirring blades and a central impulse rotor having impulse blades and pins. The stirring blades are mounted in diverging pairs relative to their rotational direction to channel charge material axially centrally within the container, while the impulse blades are V-shaped convergingly in their rotational direction to impel charge material both radially and axially outwardly within the vessel, for enhanced charge material circulation. Nozzles mounted on the end cover of the vessel inject agglomerating liquid axially into the open granulation area between the rotors for direct impingement of liquid essentially only onto the charge material. The interior wall surface of the container, the stirring blades, and the impulse blades and pins have working surfaces formed of suitable wear resistant, non-contaminating material to facilitate use of the apparatus for advanced ceramic granulation applications.

25 Claims, 9 Drawing Figures

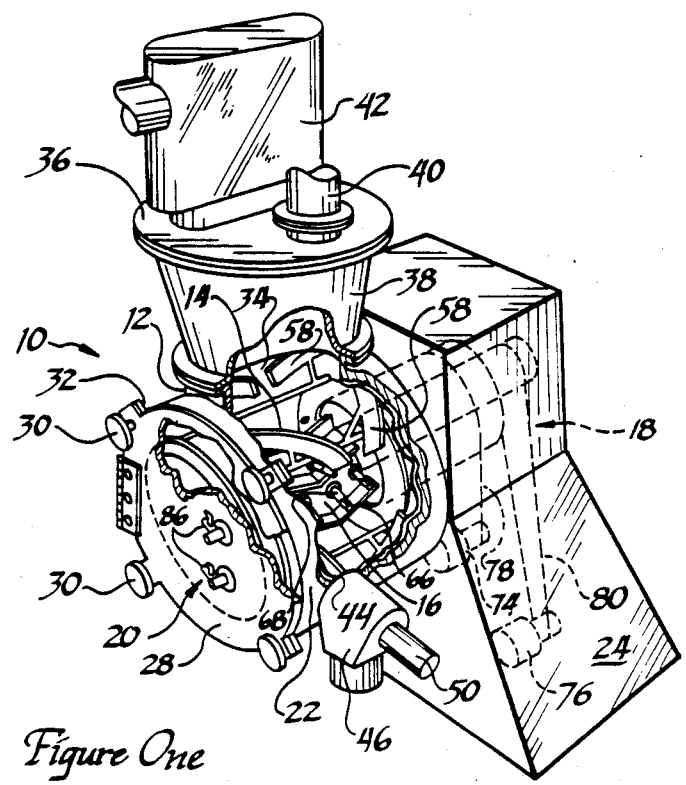
Figure One

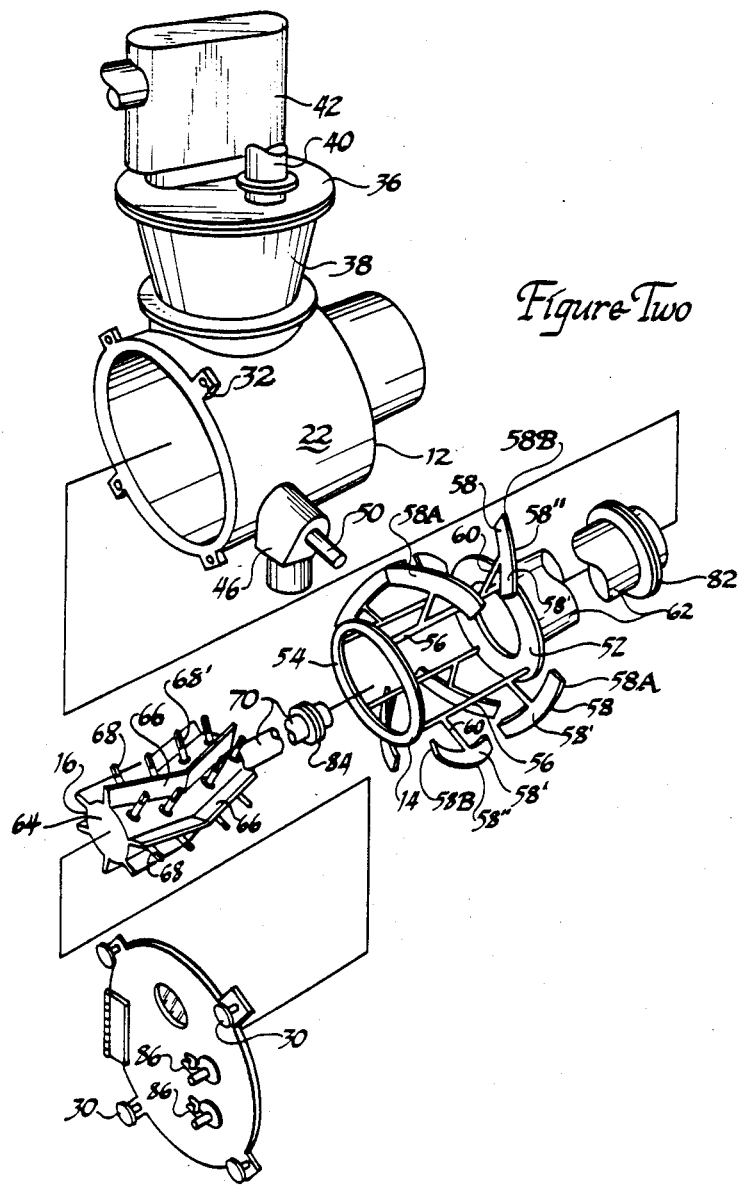
Figure Two

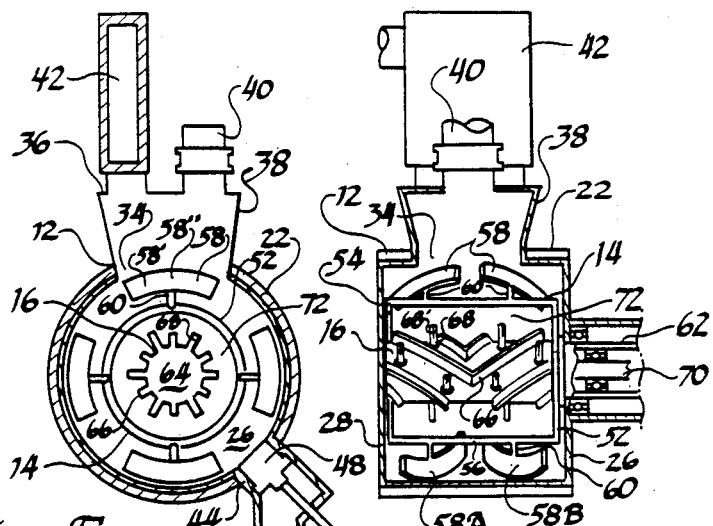
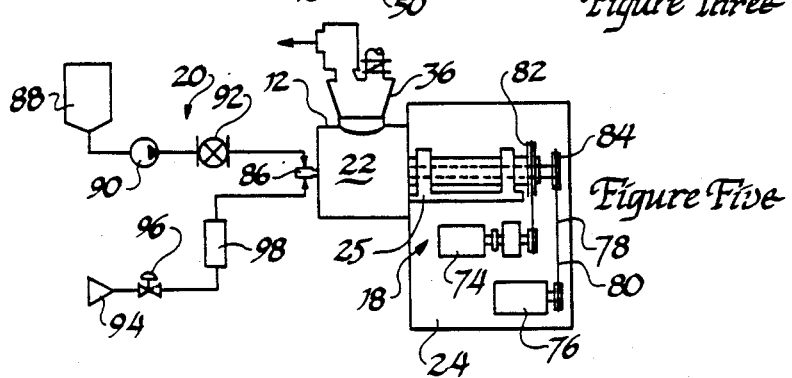
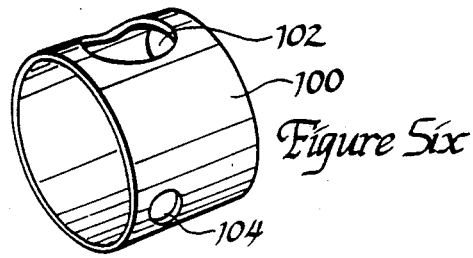

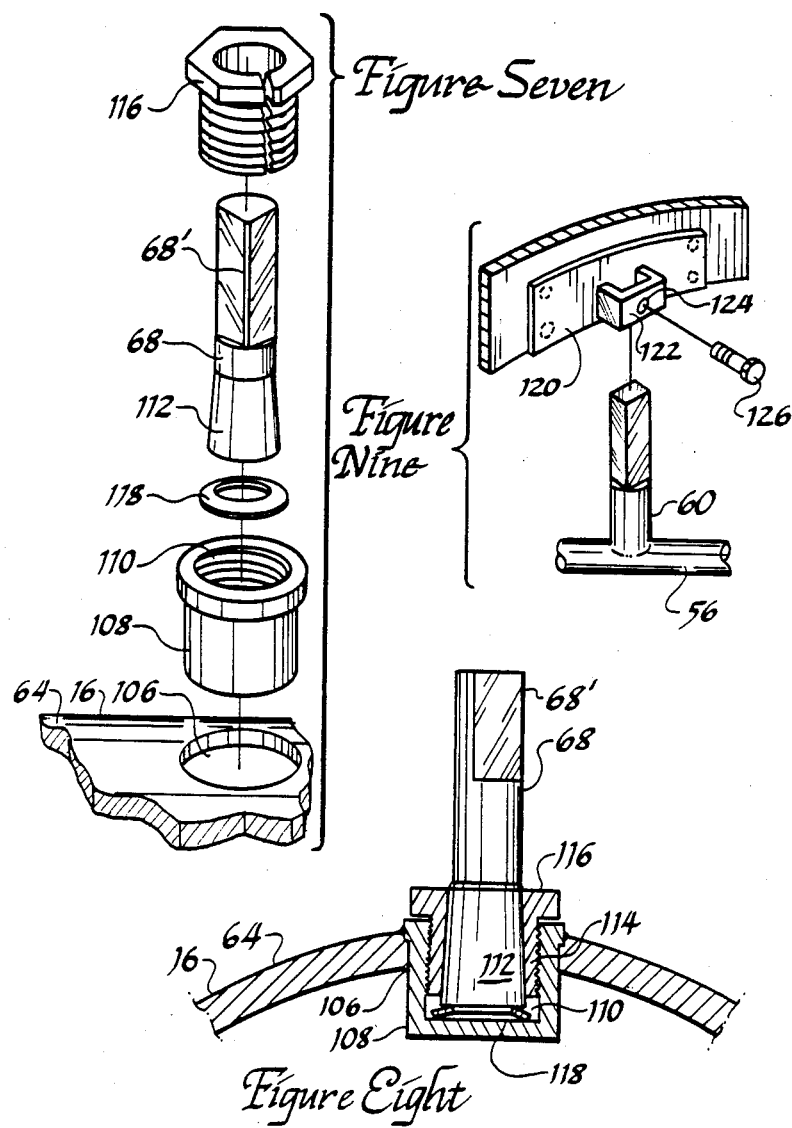

GRANULATING APPARATUS

BACKGROUND OF THE INVENTION

The present invention relates generally to granulating apparatus and, more specifically, to such apparatus of the wet aggitative type adapted for forming powder materials, particularly advanced ceramic and similar valuable materials, into granules utilizing an agglomerating liquid.

In various and diverse technologies, raw material processing conventionally requires the initial processing of raw material in powder form into larger agglomerated granules which may be more easily handled. Preferably, such agglomerated granules should be substantially spherical in shape and as uniform as possible in composition and density for ease of flowability and handling of the granules and to enhance the quality of end products formed therefrom. The formation of such uniform granules is particularly important in the preliminary processing of materials utilized in the emerging technological field of advanced ceramics. By way of example, such materials include alumina, silicon carbide, silicon nitride, barium titanate, various metal oxides, cermets such as tungsten carbide, partially stabilized zirconia, and cubic boron nitride. Advanced ceramic materials such as the foregoing find such highly technological applications as in the ferrite cores utilized in the deflection yokes for cathode ray tubes, adiabatic diesel engines and ceramic turbine engines, ceramic gas sensing devices, certain catalyst carriers and substrates, and various engineering ceramic applications such as high speed cutting tools, grinding media and the like. Such materials are conventionally formed into end products by a dry pressing or compacting operation. However, as initially processed, such materials are in a powdered form which characteristically is light, fluffy and therefore unmanageable and unsuitable for pressing operations. Accordingly, it is conventionally necessary to first form the powdered material into uniform granules which may be more readily handled and processed. Such advanced ceramic materials also are relatively expensive and valuable and, for the specialized and highly technological applications to which they are typically put, must be of optimum purity to insure a high degree of quality in the end product. Accordingly, the aforementioned requirements of uniform granule shape, composition and density are particularly acute and important in this field.

Various forms of granulating apparatus which have been developed over past years have proved entirely unsuitable and unacceptable for formation of granules of advanced ceramic materials. So-called spray dryers are currently employed widely for the mass production of advanced ceramic granules. In spray dryers, a slurry composed of powdered raw material and a binder or other agglomerating liquid is continuously sprayed in essentially discrete droplet or globular form continuously in a downward direction into the top end of an upright hollow vessel while heated drying air is directed upwardly within the vessel to drive off the agglomerating liquid thereby transforming the globules into essentially dry granules of the powdered material. While this apparatus produces generally uniform spherical granules having acceptable flowability characteristics and providing acceptable suitability for dry pressing operations, it is difficult to produce relatively dense granules due to the heat-induced evaporation of the agglomerating liquid which tends to cause outward migration of the finer particles of the powdered material toward the granule surface and thereby often produces hollow granules. Additionally, the operation of the apparatus is highly energy intensive, requiring approximately a 50% moisture level in the slurry for acceptable granulation and accordingly requiring a considerable amount of drying energy. As a result, the ratio of granule output to energy consumed is unacceptably low. The substantial drying requirements of such apparatus generally also require that the apparatus be undesirably large and bulky. Furthermore, since the granulation process performed by such apparatus is a continuous one, the apparatus is basically unsuitable for use in forming small quantities of granules. When it is desired to change the powdered material being granulated, it is of course necessary to clean the entire apparatus which is difficult and time consuming to do and often in any event results in cross contamination from one material to the next.

Extruding machinery is also available for forming moistened powder material into generally cylindrical pellet-type form by the forced extrusion of the material through a die plate or screen. Disadvantageously, it is difficult to produce pelletized granules by this operation to smaller than approximately a 0.7 mm. diameter due to rapid resultant wearing of the screen or die plate and concomitant contamination of the pelletized granules. Moreover, the cylindrical shape of the pellets significantly restricts their flowability and, as a result, such pellets are often further processed in a spheronizing vessel wherein the pellets are repetitively beaten against the vessel walls by a rotating plate to deform and plasticize the pellets into spherical form.

Disintegration-type granulating machinery is also available for breaking large agglomerations of material into smaller pieces, but such apparatus produce generally unacceptable irregular and poorly flowable granule shapes and also suffer significant losses of relatively fine particles resulting in a low granule yield rate.

Fluidized bed granulating machines have been developed which essentially combine the functions of an extruder, a spheronizer and a dryer for granule formation. In such apparatus, powdered raw material is fed into a cylindrical vessel having a stationary screen or plate with openings therethrough, the powdered material being treated with an agglomerating liquid spray on the charge side of the screen or plate while heated drying air is forced through the screen or plate openings from the opposite side thereof to form the powder into dry granules. Disadvantageously, such granulating apparatus produces a widely varying range of granule shapes and sizes which inhibit good flowability of the granules. The apparatus is often subject to rapid component wearing with resultant granule contamination, and also is not susceptible of accurate control and reproducibility of granule size.

In another form of aggitative-type granulating apparatus, a charge of powdered material is processed in batch form in a vessel having a rotating outer annular mixing or stirring rotor and an inner impulse rotor therewithin for compatibility circulating and mixing the powdered charge material, with an agglomerating liquid spray being provided for forming the powder material into granules as circulation progresses. To enhance the powdered material distribution and granule formation, blade-like implements are typically provided on each rotor and the rotors may be rotated in opposite directions with the central impulse rotor being operated at a greater speed than the outer stirring rotor. Examples of this type of granulating apparatus are disclosed in Japanese Patent Publication Nos. 58-12050, 59-21649, 59-55338, and 59-59239, commonly owned with the present invention. While these apparatus are acceptably operative for granule formation, such apparatus produces widely ranging granule sizes with poor capability for accurate repeatable control of granule size and such apparatus also suffers rapid wearing of its internal operating components with attendant contamination of the granules formed, all of which makes this apparatus generally unacceptable for forming granules of advanced ceramic and other valuable materials.

It is accordingly an object of the present invention to provide an improved granulating apparatus of the aggitative type last above-described, which is capable of repeatably accurate production of spherical granules of uniform density and composition and high purity without significant contamination, thereby being uniquely suitable for advanced ceramic granule formation.

SUMMARY OF THE INVENTION

The granulating apparatus of the present invention basically includes a granulation vessel having a material charge port and a granule discharge port, an annular stirring rotor rotatably disposed within the vessel for circulating charge material and an impulse rotor rotatably disposed within the vessel within the stirring rotor axially parallel therewith for outwardly dispersing charge material.

According to one aspect of the present invention, the apparatus provides for wet-type granulation of powder materials utilizing an agglomerating liquid. For this purpose, the stirring rotor and the impulse rotor define an annular granulation work area radially therebetween within the vessel, the work area being unrestricted by either the stirring rotor or the impulse rotor at one corresponding axial end thereof. The vessel includes an end wall adjacent such corresponding axial end of the stirring and impulse rotors and a liquid-emitting device, preferably a spray nozzle, is supported by the end wall axially adjacent the granulation work area for unrestricted emission of agglomerating liquid into the work area in a generally axial direction relative to the stirring and impulse rotors for impingement of the liquid directly and essentially only on the charge material within the vessel. Preferably, the spray nozzle arrangement is adapted for producing a conical spray pattern of the agglomerating liquid and may be selectively operated for either pressurized liquid spray applications or pneumatically-impelled liquid spray applications.

According to another aspect of the present invention, the impulse rotor and the stirring rotor are cooperatively configured for producing both axial and radial circulation of the charge material to enhance the dispersion thereof within the annular granulation work area. For this purpose, the impulse rotor is provided with a plurality of impulse members arranged thereabout and configured to disperse the charge material both radially and axially outwardly from the impulse rotor, while the stirring rotor includes a plurality of stirring members arranged thereabout and configured to direct the charge material axially inwardly of the stirring rotor. Preferably, a plurality of impulse blades are utilized as the impulse members, the blades being spaced circumferentially about the impulse rotor and extending radially outwardly for substantially the full axial extent thereof. Each impulse blade is generally V-shaped along its axial length convergingly in the circumferential direction of rotation of the impulse rotor to disperse the charge material axially outwardly from the impulse rotor. A plurality of stirring blades are utilized as the stirring members on the stirring rotor and are arranged circumferentially thereabout in axially adjacent pairs oriented divergingly with respect to one another in the circumferential direction of rotation of the stirring rotor to direct the charge material axially inwardly of the stirring rotor.

In the preferred embodiment, the vessel is generally cylindrical and is disposed with its axis extending generally horizontally. The stirring rotor is disposed generally coaxially within the vessel with the stirring blades arranged in close proximity to the vessel and a drive arrangement is provided for rotating the stirring rotor at relatively slow speeds for causing the stirring blades to circulate the charge material within the vessel. Another drive arrangement is similarly provided for rotating the impulse rotor at relatively high speeds for causing the impulse blades to turbulently impel the circulated material dispersingly within the vessel. The impulse rotor also includes a plurality of impulse pins arranged intermediate the impulse blades and extending radially outwardly from the impulse rotor substantially beyond the impulse blades for impacting charge material within the vessel to control the size of granules formed of the material.

According to another aspect of the present invention, the interior vessel wall and the working surfaces of the stirring blades, impulse blades and impulse pins of the stirring and impulse rotors, respectively, are formed of a material which is wear resistant and non-contaminating to the charge materials so that the granulating apparatus may be particularly adapted for use with advanced ceramic and other valuable charge materials. Preferably, the stirring blades are detachably mounted on the stirring rotor for ease of replacement when worn and are formed of an organic polymeric plastic material having a relatively high molecular weight, e.g. polyethylene, for suitable abrasion resistance and to permit any abraded particles released from the blades to be removed by heat application from granules formed of the charge material. The interior wall surface of the vessel may be coated or alternatively may be fitted with a removable lining, preferably of the same or a comparable material to the charge material. Similarly, the impulse rotor may be constructed of the same or a comparable material to the charge material, as by casting or molding or may be exteriorly coated with such material. The impulse pins of the impulse rotor may also be detachably mounted thereon for ready replacement when worn.

BRIEF DESCRIPTION OF THE DRAWINGS

FIG. 1 is a perspective view of a granulating apparatus according to the preferred embodiment of the present invention, with the granulating vessel partially broken away to show the vessel interior and rotor components therewithin;

FIG. 2 is an exploded perspective view of the major working components of the granulating apparatus of FIG. 1;

FIG. 3 is a vertical cross-sectional view of the granulating apparatus of FIG. 1 taken axially therethrough along line 3—3 thereof;

FIG. 4 is another vertical cross-sectional view of the granulating apparatus of FIG. 1 taken radially therethrough along line 4—4 thereof;

FIG. 5 is a schematic diagram of the overall granulating apparatus of FIG. 1;

FIG. 6 is a perspective view of a replaceable sleeve lining for the main container body of the granulating apparatus of FIG. 1;

FIG. 7 is an exploded perspective view of a portion of the impulse rotor of the granulating apparatus of FIG. 1 showing the detachable mounting assembly of one of the impulse pins thereof;

FIG. 8 is a vertical cross-sectional view taken through the portion of the impulse rotor and the impulse pin assembly of FIG. 7; and FIG. 9 is an exploded perspective view of a portion of the stirring rotor of the granulating apparatus of FIG. 1, showing the detachable mounting assembly of one of the stirring blades thereof.

DESCRIPTION OF THE PREFERRED EMBODIMENT

Referring now to the accompanying drawings and initially to FIGS. 1 and 2, the granulating apparatus of the present invention is indicated generally at 10 and basically includes a granulation vessel 12, a stirring rotor 14 and an impulse rotor 16 rotatably disposed coaxially within the vessel 12, a drive arrangement indicated generally at 18 for rotatably operating the stirring and impulse rotors 14,16, and a spray arrangement 20 for injecting agglomerating liquid into the vessel 12.

The vessel 12 includes a substantially cylindrical hollow main container body 22 supported in axially horizontal disposition by an appropriate frame structure, indicated representatively at 24. One axial end of the container body 22 is substantially closed by an integrally affixed radial end wall 26 and an end cover 28 is pivotably attached to the body 22 at its opposite axial end for opening and closing access to the body interior. Threaded locking bolts 30 mounted at spacings about the periphery of the cover 28 mate with corresondingly tapped flanges 32 arranged about the corresponding end of the body 22 to sealingly lock the cover 28 in its closed position. A material charge port 34 is formed centrally in the circumferential periphery of the body 22 at the upwardly facing side thereof and an upright material charging superstructure 36 is affixed to the container body 22 about the charge port 34. The material charging superstructure 36 includes a frusto-conical charge chute 38 opening at its lower end into the charge port 34 and being closed at its upper end by an openable material charge inlet 40 and an exhaust filter 42. A granule discharge port 44 is formed centrally in the downwardly facing side of the circumferential periphery of the container body 22 with a discharge chute 46 mounted to the container body 22 about the discharge port 44 and extending downwardly therefrom. A piston 48 is slidably disposed within the discharge chute 46 and is operated by a connecting rod 50 for opening and closing the discharge port 44.

The stirring rotor 14 is constructed of an annular cage-like configuration having a supporting radial end disk 52 and an end ring 54 arranged in spaced coaxially parallel relation with a plurality of support bars extending at spacings axially between the corresponding outer peripheries of the end disk 52 and end ring 54. A plurality of stirring blades 58 are supported at spacings about the outer circumferential periphery of the stirring rotor 14 by mounting legs 60 which extend radially outwardly from the support bars 56. Each stirring blade 58 is of an essentially arcuate platelike configuration having a radially outwardly oriented planar body 58' with an arcuate radially-outward scraper edge 58" conforming to the cylindrical interior of the container body 22. The stirring blades 58 are mounted to the support bars 56 in axially adjacent pairs 58A,58B oriented divergingly with respect to one another in the circumferential direction of rotation of the stirring rotor 14, as indicated by the directional arrow A in FIGS. 2 and 4. The diametric dimension of the stirring rotor between the outer edges 58" of diametrically opposed stirring blades 58 is approximately the same as or only slightly smaller than the interior diameter of the cylindrical container body 22. The stirring rotor 14 is supported rotatably within the hollow interior of the container body 22 in a cantilevered fashion by a tubular support shaft 62 which extends coaxially outwardly from the end disk 52 through the container end wall 26 and is rotatably journaled in a suitable support structure, indicated representatively at 25 in FIG. 5, of the drive arrangement 18.

The impulse rotor 16 includes an elongate cylindrical rotor body 64 having a plurality of impulse blades 66 and impulse pins 68 arranged about the outer circumferential periphery of the rotor body 64. The impulse blades 66 are affixed to the rotor body 64 at substantially equal circumferential spacings thereabout with each blade 66 extending radially outwardly from the rotor body 64 for substantially the full axial length thereof, each impulse blade 66 being of an essentially platelike construction configured generally V-shaped along its axial length convergingly in the circumferential direction of rotation of the impulse rotor 16, as indicated by directional arrow B in FIGS. 2 and 4. The impulse pins 68 are affixed to the rotor body 64 in radially outwardly extending orientation in V-shaped rows equidistantly intermediate the impulse blades 66. Each impulse pin 68 is of an elongated, essentially triangularly segmented cross-sectional shape of a length considerably greater than the radial dimension of the impulse blades 66 to extend substantially radially beyond the impulse blades 66, each pin 68 having a longitudinal leading edge 68' facing squarely in the direction of rotation of the impulse rotor 16. The diametric dimension of the impulse rotor 16 between the radially outward tips of diametrically opposed impulse pins 68 is smaller than the inner diameter of the supporting cage of the stirring rotor 14 and the impulse rotor 16 is supported rotatably within the hollow interior of the container body 22 coaxially within the stirring rotor 14 in cantilever fashion by a support shaft 70 which extends coaxially outwardly from one end of the rotor body 64 through the container end wall 26 and is rotatably journaled within the support structure 25 of the drive arrangement 18 coaxially within the tubular support shaft 62 for the stirring rotor 14. An annular granulation work area 72 is thus defined within the container body 22 between the circumferential periphery of the impulse rotor 16 and the stirring blades 58 of the stirring rotor 14, the granulation work area being essentially open and unrestricted between the impulse rotor 16 and the supporting end ring 54 of the stirring rotor 14 at the axial end of the container body 22 adjacent its end cover 28.

The drive arrangement 18 is best seen in FIG. 5 and basically includes individual drive motors 74,76 for the stirring and impulse rotors 14,16 operating independently through respective drive chains or belts 78,80 on respective drive wheels 82,84 mounted to the outward ends of the supporting shafts 62,70 of the stirring and impulse rotors, respectively. For reasons to be more fully explained hereinafter, the drive train to the impulse rotor 16 is arranged to effect rotation thereof at relatively high speeds in the range, for example, of 500 to 8,000 revolutions per minute, while the drive train to the stirring rotor 14 is arranged to effect rotation thereof at relatively slow speeds in the range, for example, of 10 to 50 revolutions per minute. The respective drive trains to the stirring and impulse rotors 14,16 are also arranged to effect rotation thereof in opposite directions with respect to one another, as indicated in FIGS. 2 and 4 by directional arrow A for the stirring rotor 14 and directional arrow B for the impulse rotor 16.

The spray arrangement 20 includes one or more spray nozzles 86 mounted on the end cover 28 of the container body 22 immediately axially adjacent the open granulation work area 72 in the unrestricted end open portion thereof radially between the impulse rotor 16 and the supporting end ring 54 of the stirring rotor 14 to one lateral side of the impulse rotor 16. As best seen in FIG. 5, agglomerating liquid, which may be any conventional liquid binder, water or other suitable agglomerating liquid, is supplied to the spray nozzles 86 from a liquid reservoir 88 by a suitable liquid pump 90. A flow meter 92 is provided in the liquid supply line to permit accurate control of the rate of liquid supply to the nozzles 86. The pump 90 and flow meter 92 are cooperatively set to supply the agglomerating liquid at a desired pressure and flow rate to provide a continuous liquid supply to the nozzles 86. A supply of compressed air or other suitable compressed gas 94 is also connected to the spray nozzles 86 with an appropriate in-line valve 96 and air flow meter 98 for pneumatic operation of the nozzles 86 for emitting an atomized or aspirated spray of the agglomerating liquid in an axial direction into the granulation work area 72. As desired, a liquid pump of a higher pressure capacity may be employed with the nozzles 86 or other appropriate nozzles for producing a pressurized liquid spray without pneumatic assistance. Preferably, the nozzles 86 are of the type adapted to emit the agglomerating liquid in a solid conical spray pattern.

In operation, the granulating apparatus 10 is utilized for the batch processing of powdered charge material into agglomerated granules of a predetermined desired spherical diameter. Initially, the container body 22 of the vessel 12 is charged with a measured quantity of the powdered charge material through the inlet 40 of the superstructure 36 and the liquid reservoir 88 is charged with a suitable quantity of a selected binder or other agglomerating liquid. The drive arrangement 18 is then actuated to initiate counter-rotation of the stirring and impulse rotors 14,16 respectively at relatively slow and relatively fast rotational speeds, as aforementioned. The spray arrangement 20 may be initially left deactuated for an initial period of time to permit the stirring and impulse rotors 14,16 to mix the charge material into a homogenous powder, particularly in such cases in which the charge powder includes two or more differing materials. With the liquid flow meter 92, and the air flow meter 98 if utilized, at pre-set positions, the liquid pump 90 is energized and the valve 96 is opened to inject sprays of the agglomerating liquid into the granulation work area 72 in an axial direction to wet the powdered charge material.

The particular constructions of the stirring and impulse rotors 14,16 in conjunction with the axial agglomerating liquid spray by the nozzles 86 cooperate to provide unusually rapid and precise formation of essentially spherical granules of consistently uniform density and composition. The stirring blades 58 of the stirring rotor 14 are effective to circulate the powdered charge material within the container body 22 by progressively scraping and conveying upwardly the powdered material residing lowermost within the container body 22 and gravitationally depositing the material in the region of the impulse rotor 16 and the upper level of the quantity of charge material in the direction of rotation of the stirring rotor 14. At the same time, the rapid rotation of the impulse rotor 16 is effective to tubulently impel the circulating charge material to disperse it within the container body 22 to create and maintain an axially centralized zone of fluidized suspension of the charge material. The natural centrifugal forces created by rotation of the impulse rotor 16 naturally tend to impel the charge material radially outwardly therefrom, while the V-shaped configuration of the impulse blades 66 effectively also direct the powdered material in an axially outward direction from the impulse rotor 16. At the same time, the orientation of the paired stirring blades 58 divergingly in the direction of rotor rotation are effective to channel and direct the charge material toward the axial center of the container body 22. In this manner, the stirring and impulse rotors 14,16 cause the charge material to be circulated within the container body 22 in both radial and axial directions for enhanced circulation, dispersion and suspension of the charge material particularly within the granulation work area 72 between the rotors 14,16.

As the charge material is being thusly circulated within the container body 22, the spray nozzles 86 continuously impinge the circulating charge material within the granulation work area 72 with the agglomerating liquid, the continuously recirculating suspension of the charge material effected by the stirring and impulse rotors 14,16 cooperatively insuring substantially uniform wetting of all of the charge material with the liquid. Accordingly, as the operation of the granulation apparatus 10 progresses in this manner, the wetted powdered charge material begins to adhere into granules, which are progressively densified, shaped and disintegrated into essentially uniform spheres by the continuing impulsive forces created by the impulse rotor 16. As the granulation process progresses, the radial impulse pins 68 of the impulse rotor 16 provide a disintegrational effect on the agglomerating granules to reduce and control the size of the granules as well as to aid further in the densification and shaping thereof. Particularly, the triangular cross-secitonal shape of the impulse pins 68 and their orientation with one leading edge 68' facing in the rotational direction of the impulse rotor 16 are especially effective to disintegrate the agglomerating granules. Importantly, the axial direction of the emitted liquid spray from the nozzles 86 is effective to impinge the agglomerating liquid directly onto the dispersed and suspended charge material within the granulation work area without any significant impingement of the liquid on the surfaces of the stirring and impulse rotors 14,16, owing to the coaxially cantilevered mounting of the stirring and impulsed rotors 14,16 and the open annular construction of the stirring rotor 14 at the end thereof adjacent the nozzles 86. Accordingly, in contrast with conventional granulating apparatus wherein liquid typically is injected through the material charge chute or structure, no tendency exists in the present apparatus for the charge material to agglomerate on the rotors themselves. As desired, one or more compressed air nozzles (not shown) may be mounted on the circumferential periphery of the container body 22 to direct compressed air into the peripheral interior areas of the body 22 to prevent any accumulation of the powdered material on the interior wall surfaces of the body 22.

After a relatively short period of treatment in the above manner, usually in the range of ten to fifteen minutes, the granulation process is completed to produce uniform, dense, spherical, free flowing granules of the original charge material. As will be understood by those persons skilled in the art, granule size, density and like parameters can be selectively controlled by varying the rotational speeds of the stirring and impulse rotors 14,16, the agglomerating liquid material utilized, the rate of agglomerating liquid spray, and the overall time period of the granulation process.

The enhanced uniformity of granules produced by the present granulating apparatus makes it particularly useful for the granulation of advanced ceramic and similar valuable material with which it is particularly important that a minimal range of variations exist in granule size, shape, density, composition and similar characteristics. As previously mentioned, it is additionally important in advanced ceramics processing that optimal purity of the material be maintained and, accordingly, the risk of introducing contaminating materials must be kept to a minimum. For this purpose, the present granulating apparatus also provides for all of the interior working surfaces within the container body 22 to be of a suitable material which is both wear resistant to the impulsive and frictional forces occurring during granulation and non-contaminating to the advanced ceramic or other similarly valuable charge material. Particularly, with reference to FIGS. 6-9, the granulating apparatus 10 provides for each of the interior circumferential wall surface of the container body 22, the stirring blades 58 of the stirring rotor 14, and the impulse blades and pins 66,68 of the impulse rotor 16 to be of such suitable wear resistant and non-contaminating materials.

As seen in FIG. 6, the present invention provides a cylindrical sleeve or liner 100 of an exterior diametric dimension corresponding to the interior diameter of the cylindrical container body 22 and having circumferentially-spaced openings 102,104 formed centrally in the circumferential surface of the sleeve 100 to permit the sleeve 100 to be selectively fitted snugly within the container body 22 with the openings 102,104 corresponding to the charge and discharge ports 34,44 therein and to be selectively removed and replaced as desired. The sleeve 100 may be formed of any suitable wear resistant, non-contaminating material for the particular granulating application to which the apparatus 10 is to be put. For advanced ceramic applications, it is preferably that the sleeve 100 be formed of the same advanced ceramic material as is processed within the granulating apparatus 10. Alternatively, the container body 22, as well as the other interior surfaces of the granulation vessel 12 as desired, may be formed with a diffusion/plasma coating of advanced ceramic or other suitable wear resistant, non-contaminating material.

Similarly, the exterior surfaces of the impulse rotor 16 are preferably formed of the same advanced ceramic material as that to be processed in the apparatus 10. For this purpose, the impulse rotor 16 may be cast or otherwise molded of selected advanced ceramic material or may be provided with a diffusion/plasma coating of the exposed rotor body 64, impulse blades 66 and impulse pins 68. The impulse pins 68 will be subjected to the greatest impulsive, abrasive and frictional forces during normal operation of the granulating apparatus 10 and, accordingly, it is contemplated that ceramic or ceramic-coated impulse pins 68 may be detachably and replaceably mounted to the rotor body 64 as shown in FIGS. 7 and 8. For this purpose, the cylindrical body 64 of the impulse rotor is provided with a plurality of circular openings 106 spaced about its periphery at the designated locations for the impulse pins 68 and a corresponding plurality of cup-like pin holders 108 are welded to the rotor body 64 generally flush with the outer circumferential surface thereof to present radially outwardly opening recessed areas 110 for receiving the impulse pins 68. Each detachable impulse pin 68 has a frusto-conically shaped root portion 112 adapted to be received within the recessed area 110 of a respective pin holder 108. The opposite end of the impulse pin 68 is of the generally triangularly segmented shaped described above. An exteriorly-threaded bushing 114 is provided to encircle the conical root portion 112 of the pin 68 and to threadedly engage a correspondingly interiorly threaded portion of the pin holder 108 to retain the root portion 112 within the recessed area 110 of the holder 108, the bushing 114 being provided with a hexagonal nut portion 116 to facilitate easy tightening and removal of the bushing 114 for ready installation and removal of the pin 68 as desired. A conical spring washer 118 is provided within the radially inward bottom surface of the recessed area 110 of the holder 108 to bias the pin 68 radially outwardly to maintain snug engagement between the root portion 112 of the pin 68 and the bushing 114.

For the same purpose, the stirring blades 58 of the stirring rotor 14 are detachably and replaceably mounted on the support bars 56, as shown in FIG. 9. For this purpose, each stirring blade 58 has a mounting bracket 120 affixed adhesively or by screws, as desired, to the rearward side of the body 58' of the stirring blade 58 facing away from the direction of rotation of the stirring rotor 14. The mounting bracket 120 includes an essentially square or rectangular sleeve portin 122 adapted to receive the projecting end of one of the mounting legs 60 of the stirring rotor 14, each of which mounting legs 60 is compatibly of a corresponding rectangular or square cross-sectional shape. The sleeve portion 122 of the mounting bracket 120 has a threaded opening 124 formed therethrough to receive a correspondingly threadedly bolt 126 for tightening into engagement with the mounting leg 60 to snugly secure the stirring blade and bracket assembly to its respective mounting leg 60. As will be understood, the sleeve portion 122 may be slidably positioned as desired along the compatible length of the mounting leg 60 upon assembly to thereby selectively determine the clearance between the edge 58" of the stirring blade 58 and the interior wall surface of the container body 22 of the granulation vessel 12.

As desired, the stirring blades 58 may be formed also of a selected advanced ceramic material, in which case it will be understood that the overall outer diameter of the stirring rotor 14 between diametrically opposed stirring blades 58 must be maintained within precise tolerances to insure a clearance of a relatively close spacing between the stirring blades 58 and the sleeve 100 or the interior circumferential wall surface of the container body 22 while preventing any abrasive contact therebetween. Alternatively, the stirring blades 58 may be formed of a suitable plastic material to permit the blades 58 to operate within the container body 22 in scraping surface contact with the sleeve 100 or the interior circumferential wall surface of the container body 22. For this purpose, it has been found that the particular plastic material utilized must be carefully selected to have a molecular structure which provides a high degree of wear resistance to surface contact with sleeve 100 or the container body 22 while also being adapted to release only minute particles of the plastic material in response to wearing so that the plastic material may be readily removed by heat application from any end product produced from the advanced ceramic or other charge material without significantly affecting the quality of the end product. It has been found that a high density, high molecular weight polyethylene or polyimide performs well for such purposes.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. Wet-type granulating apparatus for forming powder materials into granules thereof utilizing an agglomerating liquid, said apparatus comprising a granulation vessel having a material charge port and a granule discharge port, an annular stirring rotor rotatably disposed within said vessel for circulating charge material within said vessel, said stirring rotor including a plurality of stirring members arranged thereabout and configured to direct said charge material axially inwardly of said stirring rotor, an impulse rotor rotatably disposed within said vessel within said stirring rotor axially parallel therewith for dispersing charge material outwardly from said impulse rotor within said vessel, said impulse rotor including a plurality of impulse members arranged thereabout and configured to disperse said charge material both radially and axially outwardly from said impulse rotor, said stirring rotor and said impulse rotor defining an annular granulation work area radially therebetween within said vessel and said impulse rotor and said stirring rotor being cooperative for producing both axial and radial circulation of said charge material to enhance the dispersion thereof within said annular granulation work area, and means for emitting agglomerating liquid into said annular granulation work area in a generally axial direction relative to said stirring rotor and said impulse rotor for impingement of emitted agglomerating liquid directly and essentially only on charge material within said vessel.

2. Wet-type granulating apparatus according to claim 1 and characterized further in that said spray means is adapted for emitting said agglomerating liquid in a conical spray pattern.

3. Wet-type granulating apparatus according to claim 1 and characterized further in that each of said stirring members of said stirring rotor, each of said impulse members of said impulse rotor, and the interior wall of said vessel have working surfaces of a material which is wear-resistant and non-contaminating to said charge material for use of said granulating apparatus for forming granules of advanced ceramic and other valuable charge materials.

4. Wet-type granulating apparatus according to claim 1 and characterized further in that said impulse members comprise a plurality of impulse blades spaced circumferentially about said impulse rotor and extending radially outwardly for substantially the full axial extent of said impulse rotor, each said impulse blade being generally V-shaped along its axial length convergingly in the circumferential direction of rotation of said impulse rotor to disperse said charge material axially outwardly from said impulse rotor, and said stirring members comprise a plurality of stirring blades arranged circumferentially about said stirring rotor in axially adjacent pairs oriented divergingly with respect to one another in the circumferential direction of rotation of said stirring rotor to direct said charge material axially inwardly of said stirring rotor.

5. Wet-type granulating apparatus according to claim 4 and characterized further in that said vessel is generally cylindrical and is disposed with its axis extending generally horizontally, said stirring rotor being disposed generally coaxially within said vessel with said stirring blades arranged in close proximity to said vessel, means for rotating said stirring rotor at relatively slow speeds for causing said stirring blades to circulate said charge material within said vessel, and means for rotating said impulse rotor at relatively high speeds for causing said impulse blades to turbulently impel said circulated charge material dispersingly within said vessel.

6. Wet-type granulating apparatus according to claim 1 and characterized further in that said granulation vessel includes an end wall adjacent one corresponding axial end of said stirring rotor and said impulse rotor, said annular granulation work area being unrestricted by either said stirring rotor or said impulse rotor at said corresponding axial end thereof, and said liquid emitting means being supported by said end wall axially adjacent said granulation work area for unrestricted emission of said agglomerating liquid into said granulation work area.

7. Wet-type granulating apparatus according to claim 6 and characterized further in that said liquid emitting means comprises liquid spray means adapted for selective pressurized liquid spray applications or pneumatically-impelled liquid spray applications.

8. Wet-type granulating apparatus according to claim 6 and characterized further in that said vessel is generally cylindrical and is disposed with its axis extending generally horizontally, said stirring rotor being disposed generally coaxially within said vessel, said stirring members being arranged about the periphery of said stirring rotor in close proximity to said vessel, means for rotating said stirring rotor at relatively slow speeds for causing said stirring members to circulate said charge material within said vessel, said plurality of impulse members being arranged circumferentially and axially about said impulse rotor and means for rotating said impulse rotor at relatively high speeds for causing said impulse members to turbulently impel said circulated charge material dispersingly within said vessel.

9. Wet-type granulating apparatus according to claim 8 and characterize further in that said impulse members include a plurality of impulse blades spaced circumferentially about said impulse rotor and extending radially outwardly for substantially the full axial extent of said impulse rotor to disperse said charge material radially outwardly from said impulse rotor and a plurality of impulse pins arranged about said impulse rotor intermediate said impulse blades and extending radially outwardly substantially beyond said impulse blades for impacting charge material within said vessel for controlling the size of granules formed of charge material.

10. Wet-type granulating apparatus according to claim 8 and characterized further in that each of said stirring members of said stirring rotor, each of said impulse members of said impulse rotor, and the interior wall of said vessel have working surfaces of a material which is wear-resistant and non-contaminating to said charge material for use of said granulating apparatus for forming granules of advanced ceramic and other valuable charge materials.

11. Granulating apparatus for forming granules of a charge material, said apparatus comprising a granulation vessel having a material charge port and a granule discharge port, an annular stirring rotor rotatably disposed within said vessel for circulating charge material within said vessel, and an impulse rotor rotatably disposed within said vessel within said stirring rotor axially parallel therewith for dispersing charge material outwardly from said impulse rotor within said vessel, said impulse rotor having a plurality of impulse members arranged thereabout and configured to disperse said charge material both radially and axially outwardly from said impulse rotor and said stirring rotor having a plurality of stirring members arranged thereabout and configured to direct said charge material axially inwardly of said stirring rotor, said impulse rotor and said stirring rotor being cooperative for producing both axial and radial circulation of said charge material to enhance the dispersion thereof within said vessel.

12. Granulating apparatus according to claim 11 and characterized further in that each of said stirring members of said stirring rotor, each of said impulse members of said impulse rotor, and the interior wall of said vessel have working surfaces of a material which is wear-resistant and non-contaminating to said charge material for use of said granulating apparatus for forming granules of advanced ceramic and other valuable charge materials.

13. Granulating apparatus according to claim 11 and characterized further in that said impulse members comprise a plurality of impulse blades spaced circumferentially about said impulse rotor and extending radially outwardly for substantially the full axial extent of said impulse rotor, each said impulse blade being generally V-shaped along its axial length convergingly in the circumferential direction of rotation of said impulse rotor to disperse said charge material axially outwardly from said impulse rotor, and said stirring members comprise a plurality of stirring blades arranged circumferentially about said stirring rotor in axially adjacent pairs oriented divergingly with respect to one another in the circumferential direction of rotation of said stirring rotor to direct said charge material axially inwardly of said stirring rotor.

14. Granulating apparatus according to claim 13 and characterized further in that said vessel is generally cylindrical and is disposed with its axis extending generally horizontally, said stirring rotor being disposed generally coaxially within said vessel with said stirring blades arranged in close proximity to said vessel, means for rotating said stirring rotor at relatively slow speeds for causing said stirring blades to circulate said charge material within said vessel, and means for rotating said impulse rotor at relatively high speeds for causing said impulse blades to turbulently impel said circulated charge material dispersingly within said vessel.

15. Granulating apparatus according to claim 14 and characterized further in that said impulse rotor further comprises a plurality of impulse pins arranged thereabout intermediate said impulse blades and extending radially outwardly from said impulse rotor substantially beyond said impulse blades for impacting charge material within said vessel for controlling the size of granules formed of charge material.

16. Granulating apparatus according to claim 15 and characterized further in that each of said impulse pins is of a generally triangular cross-sectional shape and is oriented with a leading edge facing in the direction of rotation of said impulse rotor for disintegrational impact with granules formed of said charge material.

17. Granulating apparatus particularly adapted for forming granules of advanced ceramic materials and other valuable charge materials, said apparatus comprising a granulation vessel having a material charge port and a granule discharge port, said vessel having an interior wall surface of a material which is wear resistant and non-contaminating to said charge materials, an annular stirring rotor rotatably disposed within said vessel for circulating charge material within said vessel, said stirring rotor having peripheral stirring members having working surfaces formed of a material which is wear resistant and non-contaminating to said charge materials, and an impulse rotor rotatably disposed within said vessel within said stirring rotor axially parallel therewith for dispersing charge material outwardly from said impulse rotor within said vessel, said impulse rotor having a plurality of impulse members for turbulently impelling charge material outwardly from said impulse rotor for enhanced dispersion of charge material within said vessel, said impulse members having impulse working surfaces of advanced ceramic material which is wear resistant and non-contaminating to said charge materials.

18. Granulating apparatus according to claim 17 and characterized further in that said interior wall surface of said vessel comprises a coating on the interior surface of said vessel of advanced ceramic material.

19. Granulating apparatus according to claim 17 and characterized further in that said interior wall surface of said vessel comprises a removable lining disposed within said vessel of advanced ceramic material.

20. Granulating apparatus according to claim 17 and characterized further in that said impulse rotor is constructed of advanced ceramic material.

21. Granulating apparatus according to claim 17 and characterized further in that said impulse rotor includes an exterior coating of advanced ceramic material.

22. Granulating apparatus according to claim 17 and characterized further in that said impulse rotor includes a plurality of radially outwardly extending impulse pins detachably mounted about said impulse rotor, each said impulse pin having an exterior working surface of advanced ceramic material.

23. Granulating apparatus according to claim 17 and characterized further in that said stirring members comprise stirring blades detachably mounted on said stirring rotor for ease of replacement when worn.

24. Granulating apparatus according to claim 23 and characterized further in that said stirring blades are formed of an organic polymeric plastic material having a relatively high molecular weight for abrasion resistance and to permit any abraded particles released from said blades to be removed by heat application from granules formed of the charge material.

25. Granulating apparatus according to claim 24 and characterized further in that said stirring blades are formed of high molecular weight polyethylene.

* * * * *

UNITED STATES PATENT OFFICE
CERTIFICATE OF CORRECTION

Patent No. 4,655,701  Dated April 7, 1987

Inventor(s) Nobuharu Moriya

It is certified that error appears in the above-identified patent and that said Letters Patent are hereby corrected as shown below:

Col. 5, Line 43, delete "corresondingly" and insert therefor — correspondingly — .

Col. 6, Line 40, delete "elongated" and insert therefor — elongate — .

Col. 8, Line 56, delete "cross-secitonal" and insert therefor — cross-sectional — .

Col. 9, Line 27, delete "material" and insert therefor — materials — .

Col. 9, Line 62, delete "preferably" and insert therefor — preferable — .

Col. 10, Line 49, delete "portin" and insert therefor — portion — .

Signed and Sealed this

Twenty-sixth Day of January, 1988

Attest:

DONALD J. QUIGG

*Attesting Officer*  *Commissioner of Patents and Trademarks*